June 17, 1969  D. J. GREEN ET AL  3,450,990
FREQUENCY INDICATION SYSTEM

Filed Jan. 16, 1957  Sheet 1 of 6

DAVID J. GREEN,
RAYMOND B. TASKER,
DONOVAN C. DAVIS,
INVENTORS.

BY
ATTORNEY

DAVID J. GREEN,
RAYMOND B. TASKER,
DONOVAN C. DAVIS,
INVENTORS.

BY
ATTORNEY

June 17, 1969  D. J. GREEN ET AL  3,450,990
FREQUENCY INDICATION SYSTEM
Filed Jan. 16, 1957  Sheet 3 of 6

DAVID J. GREEN,
RAYMOND B. TASKER,
DONOVAN C. DAVIS,
INVENTORS.

BY
[signature]
ATTORNEY

United States Patent Office 3,450,990
Patented June 17, 1969

3,450,990
FREQUENCY INDICATION SYSTEM
David J. Green, Pacific Palisades, Raymond B. Tasker, Van Nuys, and Donovan C. Davis, Pasadena, Calif., assignors to Gilfillan Corporation, Los Angeles, Calif., a corporation of California
Filed Jan. 16, 1957, Ser. No. 634,582
Int. Cl. G01r 23/02, 23/16, 27/02
U.S. Cl. 324—78    15 Claims This invention relates to a system for indicating the frequency of an alternating signal substantially instantaneously as it is received, and more particularly to means for displaying the transmission frequency of a source of radiant energy having a frequency within a predetermined band of interest.

The frequency indication system of the present invention has a large scope of applications as do all similar systems; however, the invention has particular utility in countermeasures applications wherein certain severe operating requirements are generally imposed.

For example, for military applications a frequency indication system should have a minimum weight, occupy a minimum amount of space, and be as easy to maintain as it is possible to make it. On the other hand, the effective jamming of enemy radar requires that a rapid and reasonably accurate indication be made of the transmission frequency of an enemy radar. The system employed to produce this indication must often also be sensitive to only a single burst or pulse of microwave energy within a relatively broad band of frequencies.

In accordance with the invention, a frequency indication system is provided to meet all of these requirements. The system of the invention is especially constructed to be used with means to register, i.e. to record or to indicate the frequency of an input signal in a predetermined band of interest as a function of the ratio of two control signals. The system of the invention accordingly comprises first and second means responsive to the input signal for developing first and second sweep signals having amplitudes respectively proportional to first and second predetermined functions of the frequency of the input signal. The frequency of the input signal is then displayed as a function of the ratio of the first and second functions. The first and second means are so constructed that the slope of the ratio function with respect to frequency is always greater than zero within the limits of the predetermined band of interest except as a frequency for which the rate of change of the slope of the ratio function is equal to zero. These last requirements are made on the system of the invention to eliminate any ambiguity in displaying the frequency of the input signal. That is, to eliminate the possibility of any one indication representing two frequencies.

In the preferred practice of the invention means to indicate the frequency of the input signal comprises a cathode-ray tube having a luminescent screen with a series of indicia thereon or contiguous thereto. The tube is also provided with horizontal and vertical deflection means to deflect the cathode-ray across the luminescent screen in the horizontal and vertical directions. In this case, one of the sweep signals is impressed upon one of the deflection means and the other sweep signal is impressed upon the other of the deflection means. The cathode-ray of the tube is then directed across the luminescent screen at an angle, e.g. with respect to the horizontal, proportional to the frequency of the input signal.

Only one-quarter or one-half of the area of the luminescent screen may be used in this arrangement because of the construction of the particular means employed to develop the sweep signals. However, in accordance with another feature of the invention, a single horizontal and vertical electro static deflection plate may be maintained at a suitable negative potential whereby nearly all the area of the luminescent screen may be usefully employed.

The invention may be used to indicate the transmission frequency of continuous or pulsed microwave energy; however, in accordance with one aspect of the invention no special sawtooth sweep generators are required to sweep the cathode-ray of the indicator when pulsed energy is received. In the case of displaying the frequency of a continuous microwave signal, preferably two variable slope sawtooth sweep generators are actuated by a gate generator to produce sawtooth voltages having slopes proportional to the amplitude of each of the above-mentioned sweep signals.

In one embodiment of the invention, the above-mentioned first means includes a first waveguide having a shorted termination and the above-mentioned second means includes a second waveguide terminated in a reflectionless impedance. A first rectifier is then positioned in the first waveguide spaced from the shorted end a distance less than one-quarter of the wavelength corresponding to the maximum frequency in the predetermined band of interest. A second rectifier is also employed in the second waveguide adjacent the reflectionless termination. The outputs of each of the rectifiers are then impressed, respectively, upon the two deflection means of the cathode-ray tube indicator to deflect the beam thereof at an angle with respect to, for example, the horizontal, proportional to the frequency of the input signal.

According to another embodiment of the invention, a signal waveguide having a shorted termination is employed. Means spaced a distance more than one-quarter of the maximum frequency wavelength from the shorted termination are also employed for attenuating all waves reflected by the shorted termination. A first rectifier is then provided in the waveguide spaced a distance less than one-quarter of the maximum frequency wavelength from the shorted termination. A second rectifier is also provided in the waveguide on the side of the attenuation means opposite that of the first rectifier. As in the case before, the outputs of the first and second rectifiers are similarly impressed respectively on the two deflection means of the cathode-ray tube.

The invention also contemplates the use of a shorted waveguide having a first rectifier therein spaced a first distance less than one-quarter of the maximum frequency wavelength from the shorted termination, a second rectifier in the waveguide also spaced a second distance less than one-quarter of the maximum frequency wavelength from the shorted termination, the first distance being different from the second. In this case, as in the other two cases described above, the first and second rectifiers are respectively connected to the two deflection means of the cathode-ray tube.

In order to maintain a high signal-to-noise ratio, preferably a broadband traveling-wave tube amplifer is employed with the invention, the output of the traveling-wave tube being impressed upon each of the above-described sweep signal generating means. Pulse amplifiers are also preferably employed at the outputs of each of the sweep signal generating means with an automatic gain control circuit to maintain the frequency indicator sensitive to signals of both relatively low and high power.

In the preferred embodiment of the invention, an approximately linear indication of the frequency of an input signal is provided by, in combination, an antenna for receiving the signal, a radio frequency amplifier having a pass band at least as great as the predetermined band of interest, first and second filter attenuators having pass bands at least as large as the predetermined band of interest, the first filter attenuator having a first attenuation characteristic in the predetermined band of interest increasing with frequency, the second filter attenuator having a second attenuation characteristic in the predetermined band of interest decreasing with frequency, the slope of the first attenuation characteristic always being greater than zero except where its rate of change is equal to zero, the slope of the second attenuation characteristic likewise being greater than zero except where its rate of change is equal to zero, a first rectifier and a first pulse amplifier connected from the first filter attenuator, a second rectifier and a second pulse amplifier connected from the second filter attenuator, means responsive to the output signal amplitudes of the pulse amplifiers for controlling their gains, and a cathode-ray tube indicator having a luminescent screen and first and second deflection means to deflect the cathode-ray of the tube across the luminescent screen in two different directions, the first pulse amplifier being connected to the first deflection means and the second pulse amplifier being connected to the second deflection means.

According to a special feature of the invention the first filter attenuator above-described is constructed to have an attenuation characteristic increasing substantially linearly with frequency and the third filter attenuator is constructed to have an attenuation characteristic decreasing substantially linearly with frequency. A simple resistive card attenuator may be employed in a waveguide for the first filter attenuator; however, a section of waveguide is constructed in a particular manner to provide the third filter attenuator. Specifically, the waveguide section is constructed having at least one of its internal cross-sectional dimensions varying with its length.

It is thus obvious from the foregoing that the frequency indication system of the invention may have a minimum weight, occupy a minimum amount of space, and may be very easily maintained. In addition, the transmission frequency of an enemy radar transmitter may be easily displayed substantially instantaneously as a signal is received therefrom. The diameter of a cathode-ray impinging on a luminescent screen in conventional cathode-ray tubes may also be of such a size as to make the indicator of the invention reasonably accurate. Furthermore, simply by using a long persistence phosphor in the luminescent screen, the indicator of the invention may be made sensitive to a single burst or pulse of microwave energy.

It is therefore an object of the invention to provide a frequency indicator system having a relatively small number of uncomplicated inexpensive components.

It is another object of the invention to provide a reasonably accurate frequency indication system sensitive to a single burst of electromagnetic wave energy.

It is still another object of the invention to provide a system for sweeping the electron beam of a cathode-ray tube indicator at an angle proportional to the frequency of an input signal to the system.

A further object of the invention is to provide a frequency indication system for displaying the frequency of a pulse of microwave energy without the necessity of generating special sawtooth sweep voltages therefor.

It is a still further object of the invention to provide a new and improved microwave frequency indication system.

Yet another object of the invention is to provide means for indicating the frequency of a signal as a linear function of the angular position of a substantially straight strobe line on the luminescent screen of a cathode-ray tube.

It is also a further object of the invention to provide a new and improved waveguide filter attenuator having an attenuation characteristic decreasing linearly with frequency.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figure 1:
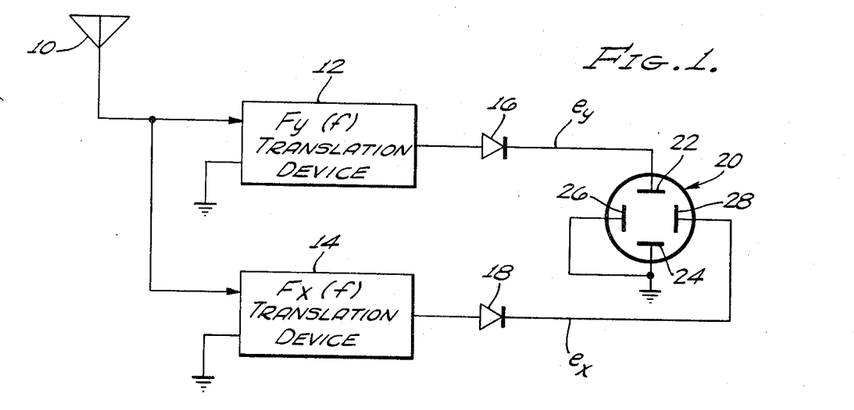
FIG. 1 is a schematic diagram of one embodiment of the invention.

In the drawings in FIG. 1 an antenna 10 shown connected to an $F_y(f)$ translation device 12 and an $F_x(f)$ translation device 14, each of which are connected respectively to rectifiers 16 and 18. Translation devices 12 and 14 may be of the type disclosed in U.S. Patent No. 2,576,249 issued Nov. 27, 1951, to H. L. Barney and described therein as networks or equalizers 24 and 26 shown in FIGS. 4A and 4B having attenuation versus frequency characteristics respectively shown at 42 and 44 in FIG. 5. The rectifiers 16, 18 employed to produce output signals $e_y$ and $e_x$, respectively, which are impressed upon a cathode-ray tube 20 having a pair of vertical deflection plates 22 and 24 and horizontal deflection plates 26 and 28. The vertical deflection plate 24 and the horizontal deflection plate 26 each are connected together and grounded. Vertical deflection plate 22 is connected from the output of rectifier 16 and horizontal deflection plate 28 is connected from the output of rectifier 18.

It is elementary that the leading edge of the envelope of pulsed microwave energy has a finite slope because the instantaneous voltage under the envelope may be represented by the function $A = A_{max} \sin \omega t$ where $A_{max}$ is a constant and $\omega$ is the radian frequency of the signal and the slope of this function is $t=0$ is no less than $$\frac{dA}{dt}\bigg]_{t=0} = \omega A_{max} \cos \omega t \bigg]_{t=0} = \omega A_{max}$$

which is finite.

In words, the last equation can be expressed thus: the slope of the function A at time $t=0$ is equal to the product, $\omega A_{max}$. However, by definition, $A_{max}$ is a constant. Hence, the algebraic equation may also be stated in different words thus: the slope of the function A at time $t=0$ is proportional to radian frequency $\omega$. Thus, it is an outstanding feature of the invention that the slope of the leading edge of the pulse is detected to determine the carrier frequency of the incoming signal.

In this case, if pulsed energy is received by the antenna 10, the cathode ray of the tube 20 will be directed across the tube at an angle proportional to the frequency of the signal. Whether the angle of a strobe line produced on the luminescent screen shown, indicated at 30 in FIG. 3, will be linearly proportional to the frequency of the signal will depend upon the functions $F_y(f)$ and $F_x(f)$.

Figure 3:
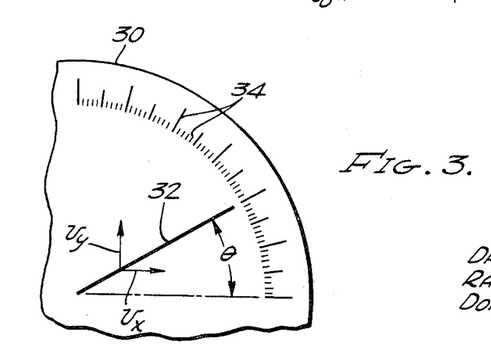
FIG. 3 is a broken-away front elevational view of the luminescent screen of the cathode-ray tube shown in FIG. 1 with a strobe line indicating the frequency of an input signal.

In order to eliminate any ambiguity in the presentation on the screen 30 of the tube 20, it is necessary that the ratio of the functions $F_y$ and $F_x$ of frequency, $f$, be always increasing or decreasing with frequency. That is, the slope of the ratio of these functions cannot be equal to zero except where the rate of change of the slope of the ratio function is equal to zero. The functions $F_y$ and $F_x$ may be any desired function, e.g. capable of being produced by filter attenuators. The function $F_y$ may be constant with frequency and the function $F_x$ may be changing. Conversely the function $F_x$ may be constant and the function $F_y$ may be changing with frequency. $F_y$ may be an increasing function of frequency and $F_x$ may be a decreasing function of frequency. Conversely $F_y$ may be a decreasing function of frequency and $F_x$ may be an increasing function of frequency.

It is to be noted that the slope of the ratio function can be zero at frequencies where the rate of change of the slope of the ratio function is not equal to zero. This is true at the extreme limits of the predetermined band of interest for which the translation devices 12 and 14 were designed. That is, at the limits of the pass bands of the translation devices 12 and 14 or the predetermined band of interest, the slope of the ratio function may be equal to zero and the rate of change of slope need not be equal to zero; however, within the limits of the predetermined band of interest, the slope may not be zero except where the rate of change of slope is zero.

In order to explain how the frequency indication system shown in FIG. 1 may be employed to produce a strobe line having an angular position proportional to the frequency of an input signal, it will be necessary to more closely examine the nature of pulsed energy and the display provided by the tube 20 on a luminescent screen 30. As shown in FIG. 3 a series of indicia 34 are provided which correspond to different frequencies. The angular position indicated by $\theta$ of a strobe line indicated at 32 may then be matched with a series of indicia 34 to determine the frequency of an incoming signal. The velocity of the beam $v_t$ of the tube 20 across the luminescent screen 30 may be divided into two components $v_y$ and $v_x$. $v_y$ will then be proportional to the slope of the leading edge of any received pulse and $v_x$ will also be proportional to the slope. However, the amount of attenuation provided by the translation devices 12 and 14 will make these velocities different.

Figure 2:
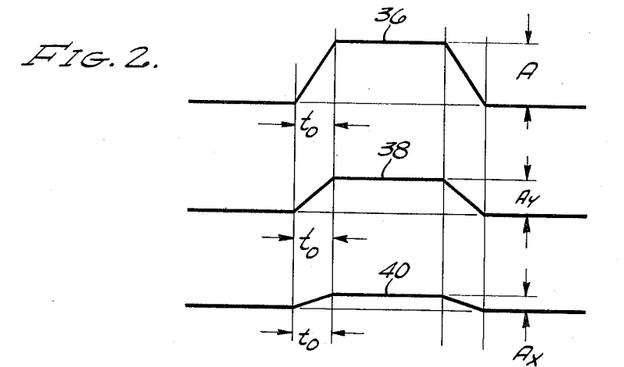
FIG. 2 is a graph of a group of waveforms characteristic of the operation of the embodiment of the invention shown in FIG. 1 when the frequency of an input signal is displayed on a cathode-ray tube without the use of special sawtooth voltage sweep generators therefor.

If simple attenuators are employed, it is easy to show that the velocities $v_y$ and $v_x$ will be proportional to the amplitudes of pulses passed by the translation devices 12 and 14. For example, if an input pulse as indicated at 36 in FIG. 2 has an amplitude A, the slope of the leading edge of the pulse will be equal to $A/t_0$, where $t_0$ is the rise time of the leading edge of the pulse 36. If translation devices 12 and 14 are attenuators, the output signal amplitude of the pulse 36 may be as indicated at 38 and 40 in FIG. 2. The amplitudes respectively are $A_y$ and $A_x$.

$$\tan \theta = \frac{v_y}{v_x} \quad (1)$$

but $$v_y = \frac{A_y}{t_0} \quad (2)$$

and $$v_x = \frac{A_x}{t_0} \quad (3)$$

disregarding constants of proportionality. Hence, $$\frac{v_y}{v_x} = \tan \theta = \frac{A_y}{A_x} \quad (4)$$

$$A_y = F_y(f) \quad (5)$$

$$A_x = F_x(f) \quad (6)$$

Thus tan $$\theta = \frac{F_y(f)}{F_x(f)} \quad (7)$$

Equation 1 is true, of course, because $v_y$ divided by $v_x$ is equal to the derivative of $y$ with respect to $x$ which is the slope of the strobe line 32. By definition a slope is equal to the tangent of the angle $\theta$. Equations 2 and 3 are true because the velocity components of the beam in the $y$ and $x$ directions in rectangular coordinates across the tube will be proportional to the rate of change of voltage in each of these directions. This, in turn, will be proportional to the slope of the leading edge of the pulse as applied to the deflection means of a cathode-ray tube. These slopes respectively are those indicated on the right side of Equations 2 and 3. The expression given by Equation 7 then is an expression of the angle of the strobe line 32 as a function of frequency in terms of what may be described as the ratio function or the ratio of $F_y$ to $F_x$ or R. A series of indicia 34 may be spaced apart according to the ratio function R in terms of the actual frequency represented by the angular position of the strobe line 32.

Figure 4:
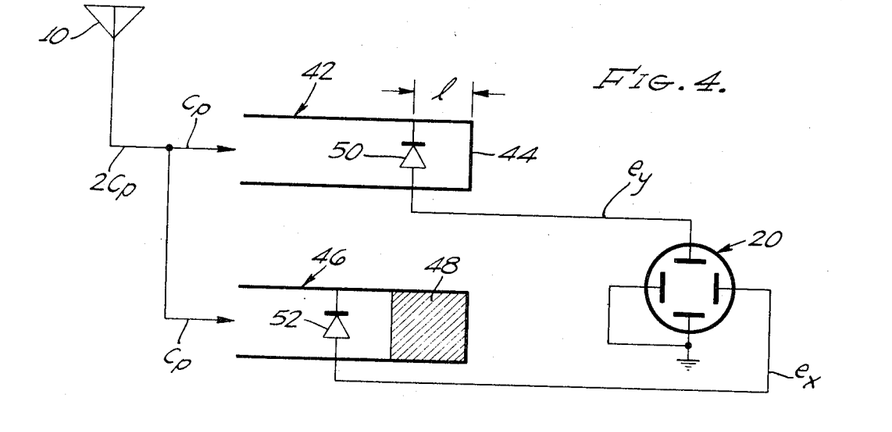
FIG. 4 is a schematic diagram of an alternative embodiment of the invention.
Figure 5:
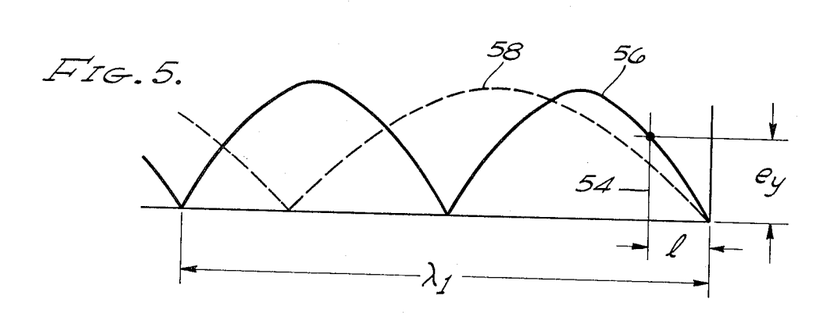
FIG. 5 is a graph of waveforms characteristic of the operation of the embodiment of the invention shown in FIG. 4.

In FIG. 4 an alternate embodiment of the invention is shown comprising a waveguide section 42 having a shorted termination 44 and a waveguide section 46 having a reflectionless termination 48. A rectifier 50 is provided in the waveguide section 42 and spaced from the shorted termination 44 a distance less than $\lambda_m/4$, where $\lambda_m$ is the wave length corresponding to the maximum expected frequency within the predetermined band of interest. A rectifier 52 is also provided in waveguide section 46 adjacent the reflectionless termination 48. The output of the rectifiers 50 and 52 are impressed upon the vertical and horizontal deflection plates respectively of the tube 20 in a manner similar to that shown in FIG. 1. The rectifier 50 may be spaced from the shorted termination 44 a distance l. As shown in FIG. 5 then the output of the rectifier 50 is indicated as $e_y$ where a straight line 54 intersects a sinusoid 56. The sinusoid is representative of standing waves created in the waveguide section 42 by the shorted termination 44. The curve 56 has an amplitude $e_y$ defined by the following relationship:

$$e_y = 2e_p \sin \frac{2\pi l}{\lambda_1} \quad (8)$$

where $e$ is the distance indicated in FIG. 5 from the termination of the waveguide and $\pi$ is 3.1416. $\lambda_1$ in this case is as shown in FIG. 5. The output of rectifier 50 thus will be high or low depending upon $\lambda_1$, which may be different as indicated by a standing wave 58 shown in dotted lines. The inputs to the two waveguides 42, 46 may be $C_p$, the energy intercepted by the antenna 10 being $2C_p$. Division of the energy may be made by a magic T or other similar microwave device.

Figure 6:
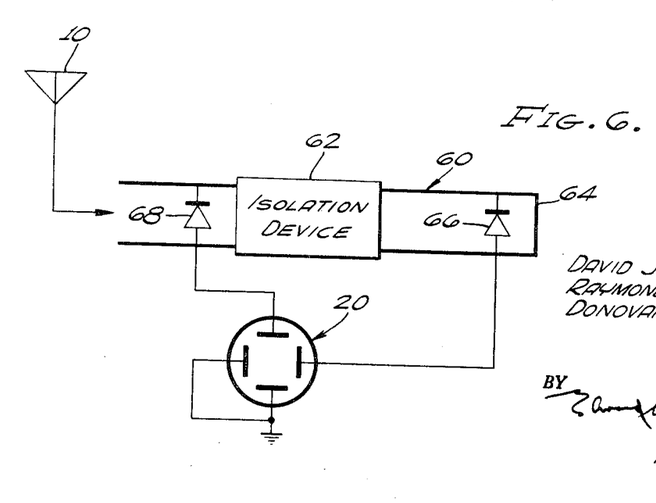
FIGS. 6 and 7 are schematic diagrams of still other alternative embodiments of the invention.

In accordance with another embodiment of the invention shown in FIG. 6, a waveguide 60 is provided with an isolation device 62 between an input from the antenna 10 and a shorted termination 64 at its right end. A rectifier 66 is then positioned a distance less than $\lambda_m/4$ from the shorted termination 64 and a second rectifier 68 is positioned on the side of the isolation device 62 opposite that of rectifier 66. The output of rectifiers 66 and 68 are then impressed upon the deflection means or electrostatic deflection plates of the cathode-ray tube 20 in a manner similar to that shown in FIGS. 1 and 4.

Figure 7:
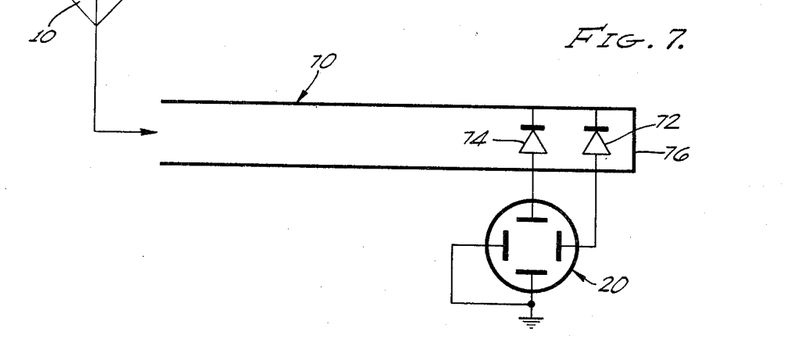
Figure 8:
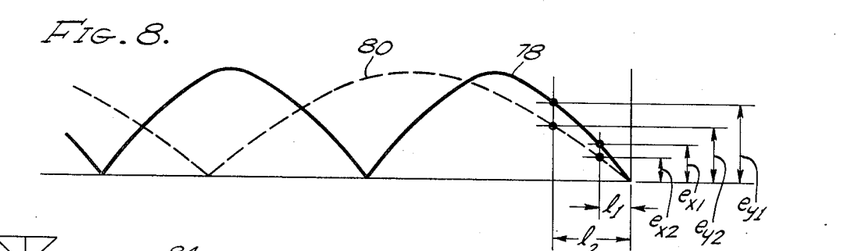
FIG. 8 is a graph of a group of waveforms characteristic of the operation of the embodiment of the invention shown in FIG. 7.

Still another embodiment of the invention is shown in FIG. 7 comprising a waveguide 70 having rectifiers 72 and 74 spaced different distances less than $\lambda_m/4$ from a shorted termination 76 at the right end of the waveguide 70. The rectifiers 72 and 74 are then connected to the electrostatic deflection plates of the cathode-ray tube 20 as before. Standing wave patterns in the waveguide section 70 may be as illustrated in FIG. 8 at 78 and 80. Outputs of the rectifiers 72 and 74 then will be set up respectively $e_{y1}$ and $e_{x1}$ as shown in FIG. 8. Similarly if the input signal to the waveguide 70 is of a different frequency causing the standing waves of the pattern 80 to be set up, the outputs of the rectifiers 72 and 74 will be respectively $e_{x2}$ and $e_{y2}$.

Figure 9:
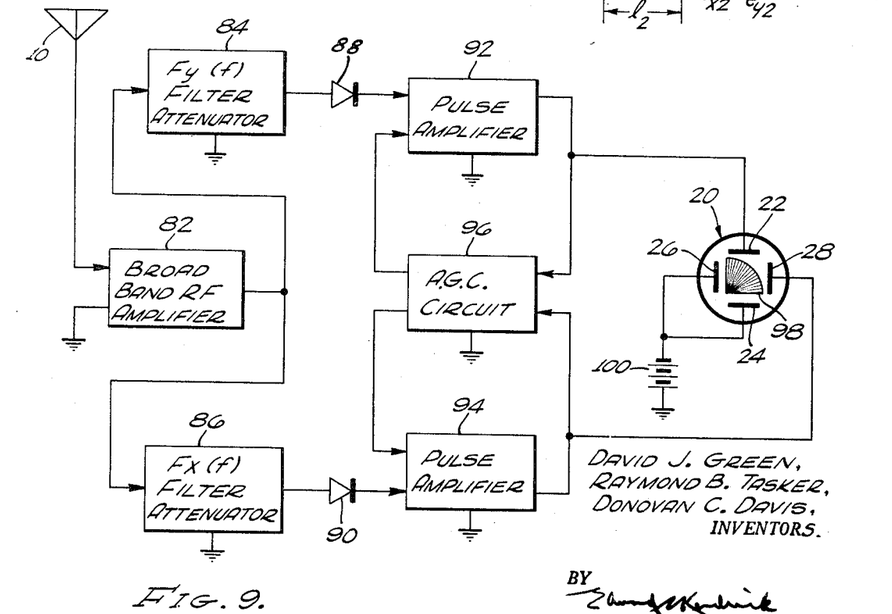
FIGS. 9 and 10 are block diagrams of still other embodiments of the invention.

Still another embodiment of the invention is shown in FIG. 9 comprising the antenna 10 to which a broadband radio frequency amplifier 82 is connected. Preferably a broadband RF amplifier is employed with the invention to provide a high signal to noise ratio. The output of the broad band radio frequency amplifier 82 is impressed upon a $F_y(f)$ filter attenuator 84 and a $F_x(f)$ filter attenuator 86. The outputs of the filter attenuators 84 and 86 are then impressed respectively upon rectifiers 88 and 90 which are subsequently impressed upon the deflection plates of the cathode-ray tube 20, respectively, through pulse amplifiers 92 and 94. In order to make the frequency indication system shown in FIG. 9 sensitive to signals of relatively low and relatively high power, preferably the pulse amplifiers 92 and 94 are provided with an AGC or automatic gain control circuit 96.

In accordance with one feature of the invention, preferably the electrostatic deflection plates 24 and 26 are maintained at a potential negative respect to ground by source 100. In this manner substantially the whole face of the luminescent screen 30 may be employed to produce a fan-shaped pattern indicated at 98 in FIG. 9 of strobe lines such as the strobe line 32 representing the frequency of input signals.

Figure 10:
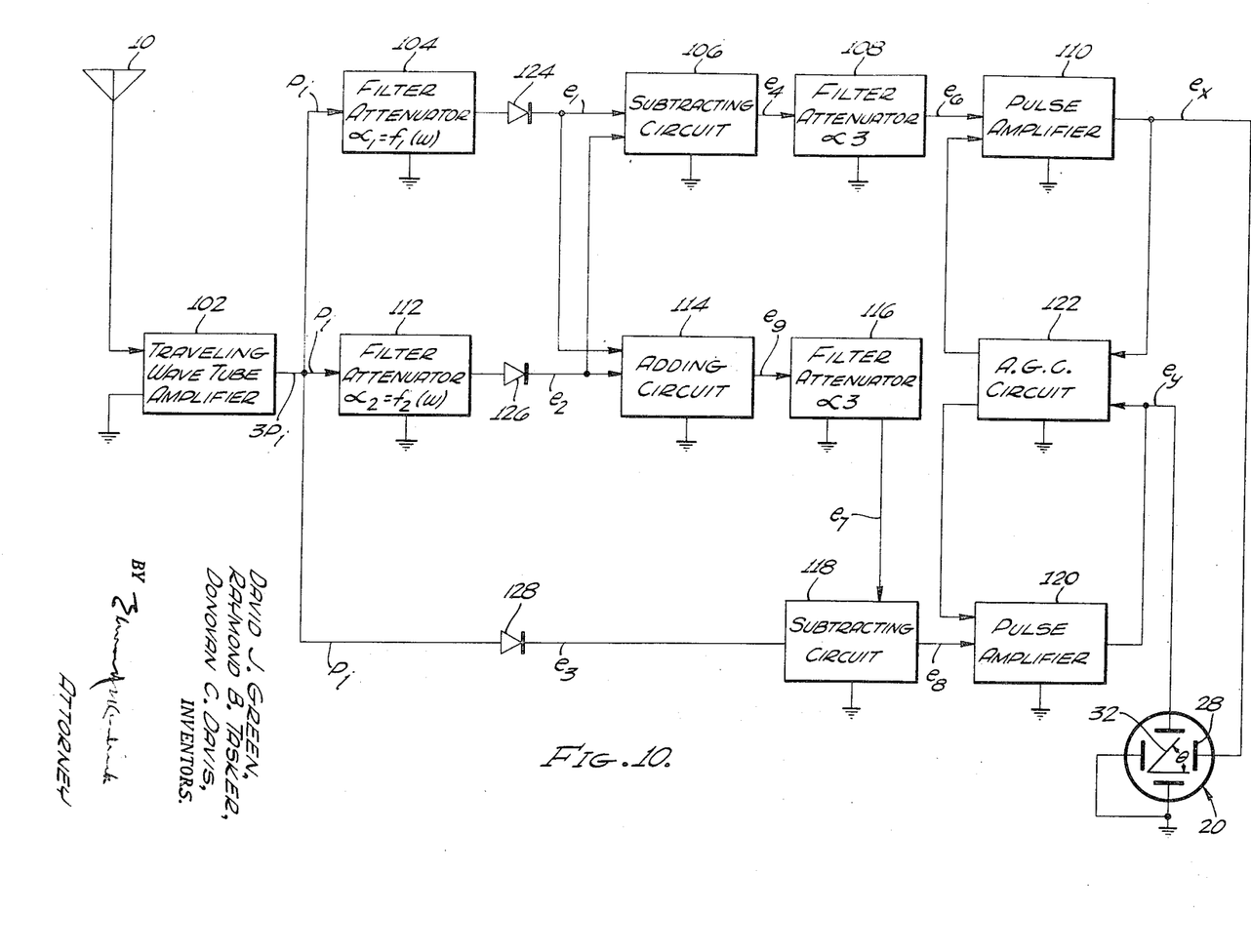

The preferred embodiment of the invention is shown in FIG. 10. This embodiment of the invention comprises a traveling wave tube amplifier 102, the output of which is divided into three channels. The first channel includes a first filter attenuator 104, a first subtracting circuit 106, a second filter attenuator 108 and a pulse amplifier 110. The second channel comprises a third filter attenuator 112, an adding circuit 114, a fourth filter attenuator 116, a second subtracting circuit 118 and a pulse amplifier 120. Preferably an AGC circuit 122 is also provided to control the gain of pulse amplifiers 110 and 120 to make the frequency indication system sensitive to signals of both a relatively low and high power as explained previously. The traveling wave tube amplifier 102 is also provided to provide broadband amplification to maintain as high a signal to noise ratio as possible.

Also provided in the first channel is a first rectifier 124 connected from first filter attenuator 104. Second channel is provided similarly with a second rectifier 126 connected from third filter attenuator 112. The third channel is connected directly to a third rectifier 128. First subtracting circuit 106 is not only connected from the output of first rectifier 124 but also from the output of second rectifier 126. Hence, a signal $e_1$ at the output of first rectifier 124 is subtracted from an output signal $e_2$ from second rectifier 126. This difference signal is attenuated by a constant amount by second filter attenuator 108. The output of filter attenuator 108 is then amplified by pulse amplifier 110 and impressed upon the horizontal deflection plate 28 of the cathode-ray tube 20. Adding circuit 114 is connected not only from second rectifier 126 but also from first rectifier 124 to add both the output signals of each of these rectifiers $e_2$ and $e_1$, respectively. The output of adding circuit 114 is attenuated by a constant amount of attenuation in fourth filter attenuator 116. The output of fourth filter attenuator 116 is then subtracted from the output of rectifier 128 or $e_3$ by second subtracting circuit 118. The output of subtracting circuit 118 indicated as $e_8$ is then employed to deflect the beam of the cathode-ray tube 20 vertically across the luminescent screen thereof.

The particular arrangement of the component parts shown in FIG. 10 of the frequency indication system of the invention is employed to produce a linear relationship between the angle $\theta$ of the strobe line 32 and the frequency of an input signal received through the antenna 10 without making $F_y(f)$ proportional to $\sin\theta$ and $F_x(f)$ proportional to $\cos\theta$. The proof of the substantial linearity which may otherwise be produced is a relatively simple matter. By defining the attenuation characteristics of first, second, third and fourth filter attenuators 104, 108, 112, and 116 respectively, as $\alpha_1$, $\alpha_3$, $\alpha_2$ and $\alpha_3$, the tangent of $\theta$ may be expressed as follows:

$$\tan\theta = \frac{e_v}{e_h} = \frac{1 - 2^{-\alpha_3}(e^{-2\alpha_1} + e^{-2\alpha_2})}{e^{-\alpha_3}(e^{-2\alpha_1} - e^{-2\alpha_2})} \quad (9)$$

where $\alpha_1$, $\alpha_2$, and $\alpha_3$, the attenuation characteristics of the three filters, are given by $$\alpha_1 = \alpha_a \frac{f - f_1}{f_2 - f_1} \quad \text{(nepers)}$$

$\alpha_2 = \alpha_a - \alpha_1$ (nepers)
$\alpha_2$ = attenuation of third filter (nepers)
$\alpha_a$ = constant (nepers)
$f_1$ = lower frequency limit of operating range
$f_2$ = upper frequency limit of operating range It is possible to evaluate $\alpha_3$ in terms of $\alpha_a$ by requiring that the cathode-ray tube deflection angle, $\theta$, be equal to zero for a frequency of $f_1$ where $\alpha_1 = 0$ and $\alpha_2 = \alpha_a$. Substituting the values in Equation 9, $$\alpha_3 = \log_0(1 + 0^{-2\alpha_a}) \text{ (nepers)} \quad (10)$$

Equation 9 may now be rewritten as $$\tan\theta = \frac{1 + 2^{-2\alpha_a} - e^{-2\alpha_1} - e^{-2\alpha_a + 2\alpha_1}}{e^{-2\alpha_1} - e^{-2\alpha_a + 2\alpha_1}} \quad (11)$$

which reduces to $$\tan\theta = \frac{\cos h(2\alpha_1 - \alpha_a) - \cos h\alpha_a}{\sin h(2\alpha_1 - \alpha_a)} \quad (12)$$

The display of sensitivity of this type of frequency discriminator is obtained by differentiating Equation 12 with respect to frequency.

$$\frac{d\theta}{df} = \frac{2\alpha_a}{f_2 - f_1} \frac{\cos h\alpha_a \cos h(2\alpha_1 - \alpha_a) - 1}{[\cos h(2\alpha_1 - \alpha_a) - \cos h\alpha_a]^2 + \sin h^2(2\alpha_1 - \alpha_a)} \quad (13)$$

To achieve equal display sensitivities at the center and the extremes of the operating frequency range it is necessary for $\alpha_a$, the maximum attenuation of the filters, to be 11.4 db. For this condition the display sensitivity is $$\frac{df}{d\theta} = 6.65 \, B \text{ mc. per degree} \quad (14)$$

where $B = f_2 - f_1$, the operating frequency range expressed in kmc.

By differentiating Equation 13 with respect to $f$ and setting equal to zero, the maximum display sensitivity corresponding to $\alpha_a = 11.4$ db occurs when $\alpha_1 = 0.24$ and 1.07, and is $$\frac{df}{d\theta_{\max}} = 4.87 \, B \text{ mc. per degree} \quad (15)$$

Figure 11:
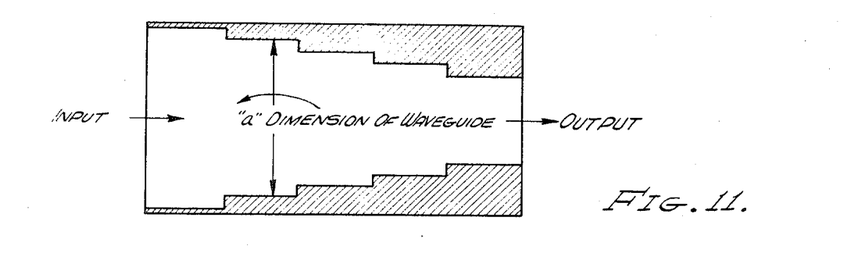
FIGS. 11, 12 and 13 are longitudinal sectional views of a section of waveguide employed in a waveguide filter attenuator having a substantially linearly decreasing attenuation characteristic with frequency.
Figure 12:
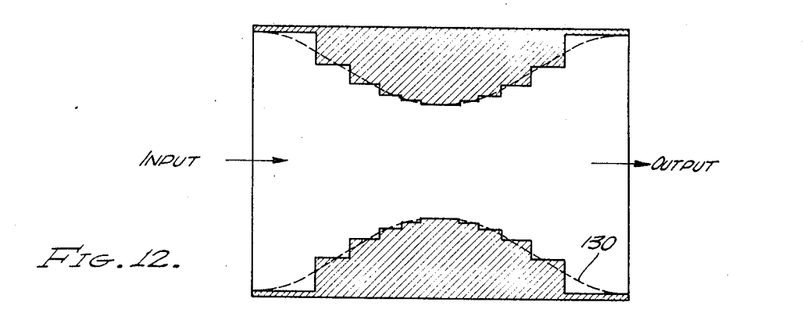
Figure 13:
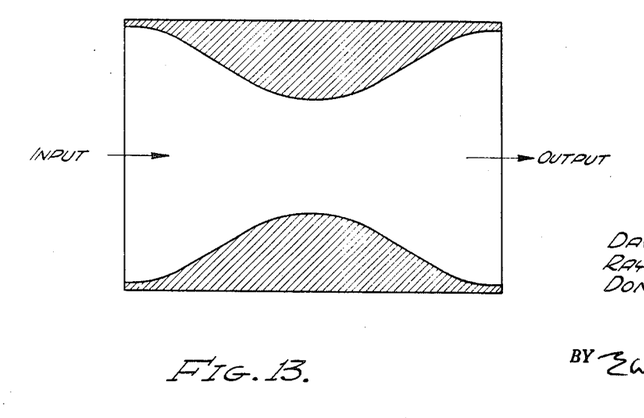

As indicated above $\alpha_1$ is preferably a linear increasing function of frequency and $\alpha_2$ is preferably a decreasing function of frequency. First filter attenuator 104 may then be a simple resistive card attenuator. However, third filter attenuator 112 must be specially designed. In accordance with one feature of the invention, it may be designed as indicated in FIGS. 11, 12 and 13.

The attenuation per unit length of a section of waveguide to frequencies beyond cutoff for the waveguide is $$\alpha_a = \frac{2\pi}{\lambda_o}\sqrt{1 - \left(\frac{f}{f_o}\right)^2} \frac{\text{nepers}}{\text{cm}} \quad (16)$$

where, for the condition $f=f_c$, $\lambda_c$ = cutoff wavelength (cm.)
$f$ = frequency of signal in waveguide,
$f_c$ = cutoff frequency of waveguide = $c/2a$
$c$ = velocity of propagation in free space (cm./sec.)
$a$ = broad dimension of waveguide (cm.).

On study of the shape of the attenuation characteristic α defined by the relationship of Equation 16 it was conceived that a linear attenuation filter, i.e. one having a linearly decreasing characteristic with frequency might be constructed by using a series of waveguide sections having different cutoff frequencies. A waveguide having such a cross-section is shown in FIG. 11. The length of each section is selected so that all sections have equal attenuation at $0.4f_c$, where $f_c$ is the cutoff frequency of the narrowest section. A filter section similar to the one shown in FIG. 11 would suffer from two disadvantages: (1) there would be an impedance discontinuity and, consequently, a reflection at each step in the waveguide, and (2) the output section of such a filter would be a waveguide beyond cutoff. The problems of reflections may be minimized by making the sides of the waveguide filter smooth surfaces which approximate as nearly as possible the original step-section (see FIG. 13). This problem was eliminated by making each filter section half as long as before and doubling the number of sections so that the frequencies of all signals in the range of operation are above cutoff at the input and output sections of the filter (see FIG. 12).

A dotted line 130 in FIG. 12 is representative of the cross-section of the waveguide shown in FIG. 13.

Figure 14:
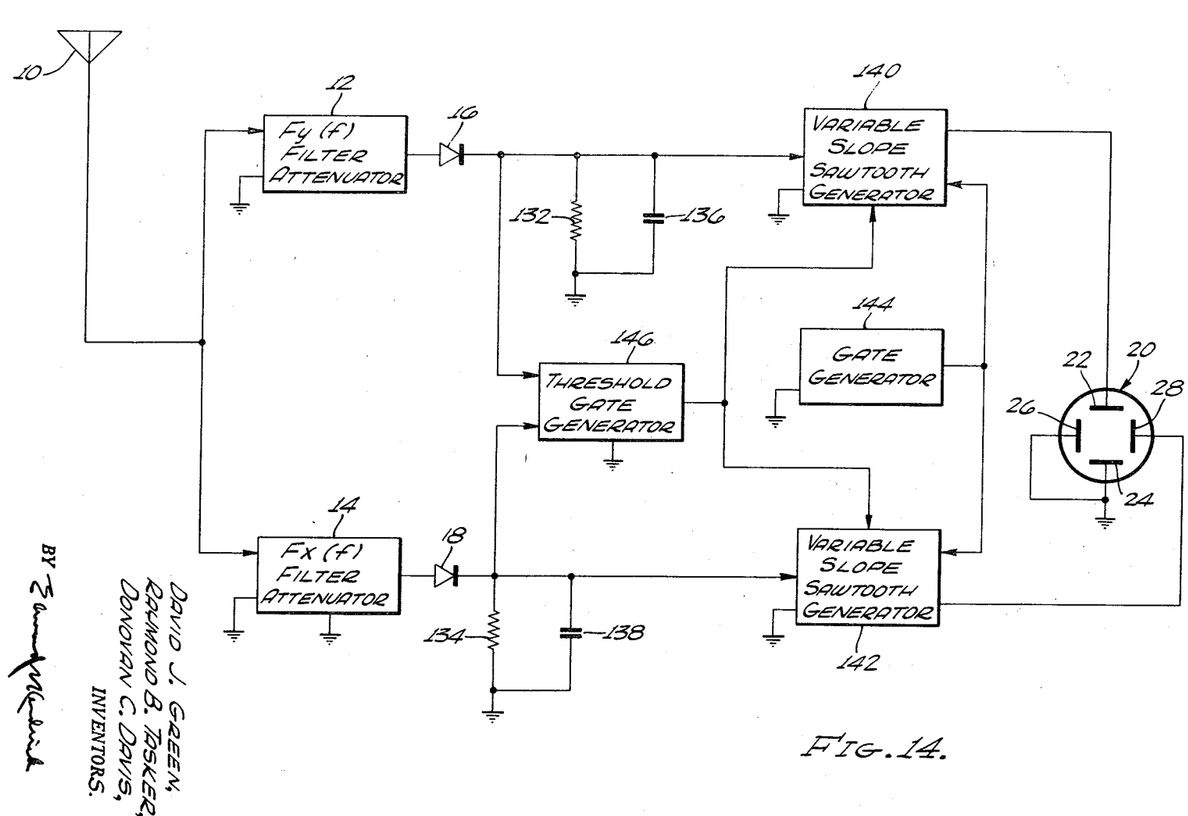
FIG. 14 is a block diagram of an alternative embodiment of the invention employed to indicate the frequency of a continuous alternating signal on the luminescent screen of a cathode-ray tube.

All the component parts of the frequency indication system shown in FIG. 1 are shown in FIG. 14. However, additional component parts are also shown connected from the first and second rectifiers 16 and 18 to the cathode-ray tube 20. Specifically, first and second resistors 132 and 134 are connected from the outputs of rectifiers 16 and 18 to ground. First and second capacitors 136 and 138 are then connected in parallel with the resistors 132 and 134, respectively.

The outputs of first and second rectifiers 16 and 18 are then impressed upon first and second variable slope sawtooth generators 140 and 142 which are both operated by the same gate generator 144. The output of a threshold gate generator 146 is also impressed upon variable slope sawtooth generators 140 and 142, the outputs of which are impressed on the electrostatic deflection plates 22 and 28, respectively, of the cathode-ray tube 20.

In the operation of the frequency indication system shown in FIG. 14, the frequency of a continuous alternating signal received through antenna 10 is displayed in the same manner as indicated in FIG. 3 by a strobe line, such as, for example, strobe line 32. However, sawtooth voltages are impressed upon the vertical and horizontal deflection plates of the cathode-ray tube 20, the sawtooth sweep voltages having a slope in proportion to the output signals of the first and second rectifiers 16 and 18, respectively. The sawtooth generators 140 and 142 are periodically operated by gate generator 144 which may be a free running multivibrator. Preferably load resistors 132 and 134 are provided with capacitors 136 and 138, the time constant of these resistance capacitance circuits preferably being about equal to the period of a signal at the center of the pass bands of each of the filter attenuators 12 and 14.

In order to prevent the display of any strobe on the cathode-ray tube 20, the threshold gate generator may be employed to suppress any output signal from the sawtooth generators 140 and 142 in the event that a signal is not received through the antenna 10 having an amplitude above a predetermined and selected minimum level.

It will be obvious that in many of the embodiments of the invention, such as, for example, the embodiment shown in FIG. 14, means may be provided between the filter attenuators and the rectifiers or between the rectifiers and the cathode-ray tube 20 to match the attenuation versus frequency characteristics of the filter attenuators 12 and 14. Such devices may be employed to provide a linear angle versus frequency display of the strobe line on the cathode-ray tube 20. Such devices may be logarithmic amplifiers or other devices or tubes having variable gain or input versus output characteristics. This is specially noted because the outputs of one of the filter attenuators 12 or 14 will be some function of frequency which may be matched with non-linear versus output characteristics of any known passive or active network.

It will be obvious to those skilled in the art that many other changes and modifications of the invention may be made without departing from the true scope thereof as defined in the appended claims.

What is claimed is:

1. In a system for frequency measurement having means to register the frequency of an input signal in a predetermined band of interest as a function of the ratio of the slopes of two sawtooth voltages, the combination comprising: first means responsive to said input signal for producing a first control signal having an amplitude proportional to a first function of the frequency of said input signal, second means also responsive to said input signal for producing a second control signal having an amplitude proportional to a second function of the frequency of said input signal, the absolute value of the slope of the ratio of one of said functions to the other always being greater than zero within the limits of said predetermined band of interest except at a frequency for which the rate of change of said slope is equal to zero, third means responsive to said first control signal for producing a first sawtooth voltage having a slope proportional to the amplitude of said first control signal, and fourth means responsive to said second control signal for producing a second sawtooth voltage having a slope proportional to the amplitude of said second control signal.

2. The invention as defined in claim 1, wherein each of said third and fourth means includes a rectifier to detect said first and second control signals respectively.

3. A system for measuring the frequency of an input signal in a predetermined band of interest, said system comprising: first means responsive to said input signal for producing a first control singal having an amplitude proportional to a first function of the frequency of said input signal, second means also responsive to said input signal for producing a second control signal having an amplitude proportional to a second function of the frequency of said input signal, the absolute value of the slope of the ratio of one of said functions to the other always being greater than zero within the limits of said predetermined band of interest except at a frequency for which the rate of change of said slope is equal to zero, third means responsive to said first control signal for producing a first sawtooth voltage having a slope proportional to the amplitude of said first control signal, fourth means responsive to said second control signal for producing a second sawtooth voltage having a slope proportional to the amplitude of said second control signal, an indicator having a series of indicia thereon to identify the frequency of said input signal, and fifth means responsive to the ratio of the slopes of said first and second sawtooth voltages for displaying an identifying mark in visual correspondence to said series of indicia, whereby the frequency of said input signal may be determined by comparing the position of said identifying mark with said series of indicia, said indicia being spaced in proportion to said ratio function of frequency.

4. The invention as defined in claim 3, wherein each of said third and fourth means includes a rectifier.

5. A system for measuring the frequency of an input signal in a predetermined band of interest, said system comprising: first means responsive to said input signal for producing a first sweep signal having an amplitude proportional to a first function of the frequency of said input signal, second means also responsive to said input signal for producing a second sweep signal proportional to a second function of the frequency of said input signal, the absolute value of the slope of the ratio of one of said functions to the other always being greater than zero within the limits of said predetermined band of interest except at a frequency for which the rate of change of said slope is equal to zero, a cathode-ray tube having a luminescent screen and an arcuate series of indicia fixed thereto to indicate the frequency of said input signal, said tube also having two deflection means to deflect the cathode-ray thereof in two directions across said luminescent screen, and third means responsive to said first sweep signal for impressing a first sawtooth voltage on one of said deflection means, said first sawtooth voltage having a slope proportional to the amplitude of said first sweep signal, and fourth means responsive to said second sweep signal for impressing a second sawtooth voltage on the other of said deflection means, said second sawtooth voltage having a slope proportional to the amplitude of said second sweep signal.

6. The invention as defined in claim 5, wherein said third means includes a first rectifier connected from said first means and a first variable slope sawtooth generator connected from said first rectifier for producing said first sawtooth voltage, said fourth means includes a second rectifier connected from said second means and a second variable sawtooth generator connected from said second rectifier for producing said second sawtooth voltage, and wherein the following are additionally provided: a gate generator for operating both said first and second variable slope sawtooth generators periodically and simultaneously, said first variable slope sawtooth generator being adapted to generate a sawtooth voltage having a slope proportional to the output signal of said second rectifier.

7. A system for displaying the frequency of a microwave signal in a predetermined band of interest having a maximum frequency with the corresponding minimum wavelength $\lambda_m$, said system comprising: first and second waveguides; means to propagate the wave energy of said microwave signal through said first and second waveguides simultaneously, said first waveguide being shorted at one end and said second waveguide being terminated in a reflectionless impedance; a first rectifier in said first waveguide spaced from said shorted end a distance less than $\lambda m/4$; a second rectifier in said second waveguide adjacent said reflectionless termination; and a cathode-ray tube indicator having a luminescent screen and first and second deflection means to deflect the cathode-ray across the luminescent screen in two different directions, said first rectifier being connected to said first deflection means and said second rectifier being connected to said second deflection means.

8. A system for displaying the frequency of a microwave signal in a predetermined band of interest having a maximum frequency with the corresponding minimum wavelength $\lambda_m$, said system comprising: a waveguide having a shorted termination, isolation means spaced a distance more than $\lambda_m/4$ from said shorted termination for attenuating all waves reflected from said shorted termination, a first rectifier in said waveguide spaced a distance less than $\lambda_m/4$ from said shorted termination, a second rectifier in said waveguide on the side of said isolation means opposite that of said first rectifier, and a cathode-ray tube indicator having a luminescent screen and first and second deflection means to deflect the cathode-ray across the luminescent screen in two different directions, said first rectifier being connected to said first deflection means and said second rectifier being connected to said second deflection means.

9. A system for displaying the frequency of a microwave signal in a predetermined band of interest having a maximum frequency with the corresponding minimum wavelength $\lambda_m$, said system comprising: a waveguide having a shorted termination, a first rectifier in said waveguide spaced from said shorted termination a first distance less than $\lambda_m/4$, a second rectifier in said waveguide also spaced from said shorted termination a second distance less than $\lambda_m/4$, one of said distances being greater than the other, and a cathode-ray tube indicator having a luminescent screen and first and second deflection means to deflect the cathode-ray across the luminescent screen in two different directions, said first rectifier being connected to said first deflection means and said second rectifier being connected to said second deflection means.

10. A system for displaying the frequency of a radiated signal in a predetermined band of interest, said system comprising: an antenna for receiving said signal, a radio frequency amplifier having a pass band at least as great as said predetermined band of interest, first and second filter attenuators having pass bands at least as large as said predetermined band of interest, said first filter attenuator having attenuation characteristic $\alpha_1$ in said predetermined band of interest increasing with frequency $f$, said second filter attenuator having attenuation characteristic $\alpha_2$ in said predetermined band of interest decreasing with frequency $f$, $$\left|\frac{d\alpha_1}{df}\right|$$

always being greater than zero except where $$\frac{d^2\alpha_1}{df^2}$$

is equal to zero, $$\left|\frac{d\alpha_2}{df}\right|$$

likewise being greater than zero except where $$\frac{d^2\alpha_2}{df^2}$$

is equal to zero, a first rectifier and a first pulse amplifier connected from said first filter attenuator, a second rectifier and a second pulse amplifier connected from said second filter attenuator, means responsive to the output signal amplitudes of said pulse amplifiers for controlling their gains, and a cathode-ray tube indicator having a luminescent screen and first and second deflection means to deflect the cathode-ray of said tube across said luminescent screen in two different directions, said first pulse amplifier being connected to said first deflection means and said second pulse amplifier being connected to said second deflection means.

11. A system for displaying the frequency of an input signal in a predetermined band of interest, said system comprising: means for impressing said input signal on first, second and third channels; said first channel including a first filter attenuator having an attenuation $\alpha_1$ in nepers linearly variable with frequency $f$, connected from said input signals means, a first rectifier connected from said first filter attenuator, a first subtracting circuit connected from said first rectifier, a second filter attenuator having an attenuation characteristic $\alpha_3$ in nepers, $\alpha_3$ being constant with frequency connected from said input signal means; said second channel including a third filter attenuator having an attenuation characteristic $\alpha_2$ in nepers linearly varying with frequency $f$, a second rectifier connected from said third filter attenuator, an adding circuit connected from said second rectifier, a fourth filter attenuator having an attenuation characteristic $\alpha_3$ in nepers connected from said adding circuit; said third channel including a third rectifier and a second subtracting circuit connected serially from said input signal means; said first subtracting circuit also having an input from said second rectifier to subtract the output signal of said second rectifier from the output signal of said first rectifier; said adding circuit also having an input from said first rectifier to add the output signal of said first rectifier to the output signal of said second rectifier; said second subtracting circuit also having an input from said fourth filter attenuator to subtract it from the output of said third rectifier; and a cathode-ray tube indicator having a luminescent screen and first and second deflection means to deflect the cathode-ray of said tube across said luminescent screen in two different directions, the output of said second filter attenuator being connected to said first deflection means and the output of said second subtracting circuit being connected to said second deflection means, whereby the angle that the cathode-ray of said tube is deflected across said luminescent screen by the application of said input signal to said first, second and third channels, is substantially a linear function of the frequency of said input signal.

12. The invention as defined in claim 11, wherein
$\alpha_1$ is equal to $$\alpha_a \left(\frac{f-f_1}{f_2-f_1}\right)$$

$\alpha_2$ is equal to $\alpha_a - \alpha_1$,
where
$\alpha_a$ is a design constant,
$f_1$ is equal to the minimum frequency in said predetermined band of interest,
$f_2$ is equal to the maximum frequency in said predetermined band of interest,
and
$\alpha_3$ is defined by the following relationship:
$\alpha_3 = \log_e [\tan \theta_0 (1-e^{-2\alpha_1}) + (1-e^{-2\alpha_n})]$
where
$\theta_0$ equals $\theta$ at $f=f_1$, and
$e$ is the natural logarithmic base.

13. Frequency measuring apparatus comprising: a first filter responsive to an input pulse of an alternating signal for producing an alternating output signal of an amplitude proportional to an increasing function of the frequency of said alternating signal; a first rectifier responsive to the output signal of said filter for producing a first ramp voltage having a slope proportional to the increasing function of the frequency of said alternating signal; a second filter responsive to said input pulse for producing an alternating output signal proportional to a decreasing function of the frequency of said alternating signal; a second rectifier responsive to the output signal of said second filter for producing a second ramp voltage having a slope proportional to a decreasing function of the frequency of said alternating signal; and means responsive to both of said ramp voltages for producing an output signal proportional to the ratio of the slopes thereof.

14. Frequency measuring apparatus comprising: a first filter responsive to an input pulse of an alternating signal for producing an alternating output signal of an amplitude proportional to an increasing function of the frequency of said alternating signal; a first rectifier responsive to the output signal of said filter for producing a first ramp voltage having a slope proportional to the increasing function of the frequency of said alternating signal; a second filter responsive to said input pulse for producing an alternating output signal proportional to a decreasing function of the frequency of said alternating signal; a second rectifier responsive to the output signal of said second filter for producing a second ramp voltage having a slope proportional to a decreasing function of the frequency of said alternating signal; and a cathode-ray tube having first and second deflection means responsive to said first and second ramp voltages respectively for sweeping the beam thereof in an angular direction proportional to the ratio of the slopes of said ramp voltages.

15. Frequency measuring apparatus comprising: a first filter responsive to an input pulse of an alternating signal for producing an alternating output signal of an amplitude proportional to an increasing function of the frequency of said alternating signal; a first rectifier responsive to the output signal of said filter for producing a first ramp voltage having a slope proportional to the increasing function of the frequency of said alternating signal; a second filter responsive to said input pulse for producing an alternating output signal proportional to a decreasing function of the frequency of said alternating signal; a second rectifier responsive to the output signal of said second filter for producing a second ramp voltage having a slope proportional to a decreasing function of the frequency of said alternating signal; a pulse amplifier to amplify the outputs of each of said first and second rectifiers; and a cathode-ray tube having first and second deflection means responsive to said first and second ramp voltages respectively for sweeping the beam thereof in an angular direction proportional to the ratio of the slopes of said ramp voltages.

References Cited

UNITED STATES PATENTS

| | | | |
|---|---|---|---|
| 2,496,772 | 2/1950 | Bradley | 333—73 |
| 2,573,012 | 10/1951 | Gutton | 333—73 |
| 2,576,249 | 11/1951 | Barney | 324—78 |
| 2,737,630 | 3/1956 | Miller | 333—73 |
| 2,806,140 | 9/1957 | Enenstein | 333—73 |
| 2,022,790 | 12/1935 | Sturdy | 324—82 |
| 2,434,914 | 1/1943 | Earp | 324—82 |
| 2,541,067 | 2/1951 | Jaynes | 324—82 |
| 2,591,798 | 4/1952 | Herman | 324—82 |
| 2,457,136 | 12/1948 | Earp | 324—82 |
| 2,474,688 | 6/1949 | Pease | 333—34 X |
| 2,594,978 | 4/1952 | Nelson | 333—24 X |
| 2,576,249 | 11/1951 | Barney | 324—77 |

RODNEY D. BENNETT, JR., *Primary Examiner.*

CHARLES E. WANDS, *Assistant Examiner.*

U.S. Cl. X.R.
324—77; 333—34